United States Patent [19]

Tripp

[11] 3,932,699
[45] Jan. 13, 1976

[54] THREE-DIMENSIONAL TELEVISION

[76] Inventor: R. Maurice Tripp, 15231 Quito Road, Saratoga, Calif. 95070

[22] Filed: Nov. 26, 1973

[21] Appl. No.: 419,123

[52] U.S. Cl. ............................... 178/6.5
[51] Int. Cl.² ............................. H04N 9/54
[58] Field of Search ..................... 178/6.5

[56] References Cited
UNITED STATES PATENTS

| | | | |
|---|---|---|---|
| 3,632,866 | 1/1972 | King | 178/6.5 |
| 3,688,045 | 8/1972 | Ohkoshi | 178/6.5 |
| 3,852,524 | 12/1974 | Ando | 178/6.5 |

FOREIGN PATENTS OR APPLICATIONS

| | | | |
|---|---|---|---|
| 1,273,062 | 5/1972 | United Kingdom | 178/6.5 |

*Primary Examiner*—Howard W. Britton
*Assistant Examiner*—Michael A. Masinick
*Attorney, Agent, or Firm*—C. Michael Zimmerman, Esq.

[57] ABSTRACT

A depth perception television system is described. Light radiation from a three-dimensional scene is collected by a convergent lens and transmitted through a lenticulated grid onto the face of a light radiation sensing tube of a television camera. The lenticulated grid is made up of a multiplicity of vertically oriented lens elements, each of which has a generally cylindrical arc incident surface and a generally planar exit surface. Such lenticulated grid acts to separate light radiation received thereby into a plurality of image elements of each aspect of the scene and then focus the same at predetermined locations on the pick-up surface of the camera. An electrical signal representative of the locations on the face of the camera at which such image elements are focused is formed in a conventional manner by the camera and transmitted to a monitor which conventionally displays such image elements on a display screen, such as the face of a cathode ray tube. The image element radiation from the display screen is intercepted by a second lenticulated grid similar to the first but with the radiation passing in the opposite direction therethrough. The lens elements of the second grid act to isolate each eye from seeing more than one of the multiple images on the screen at a time and to insure that each eye sees a slightly different image as though viewing from a different location.

20 Claims, 3 Drawing Figures

U.S. Patent  Jan. 13, 1976  3,932,699
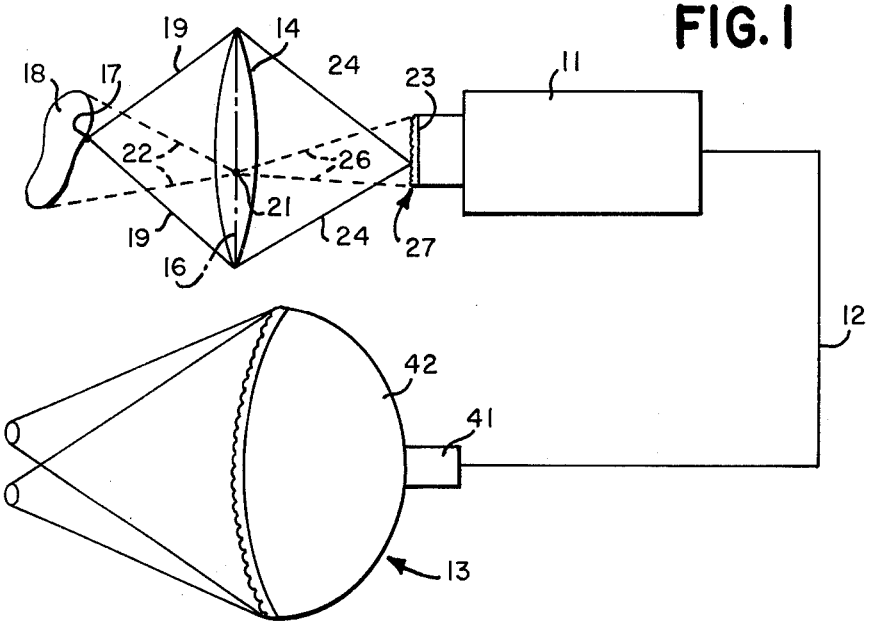
FIG. 1
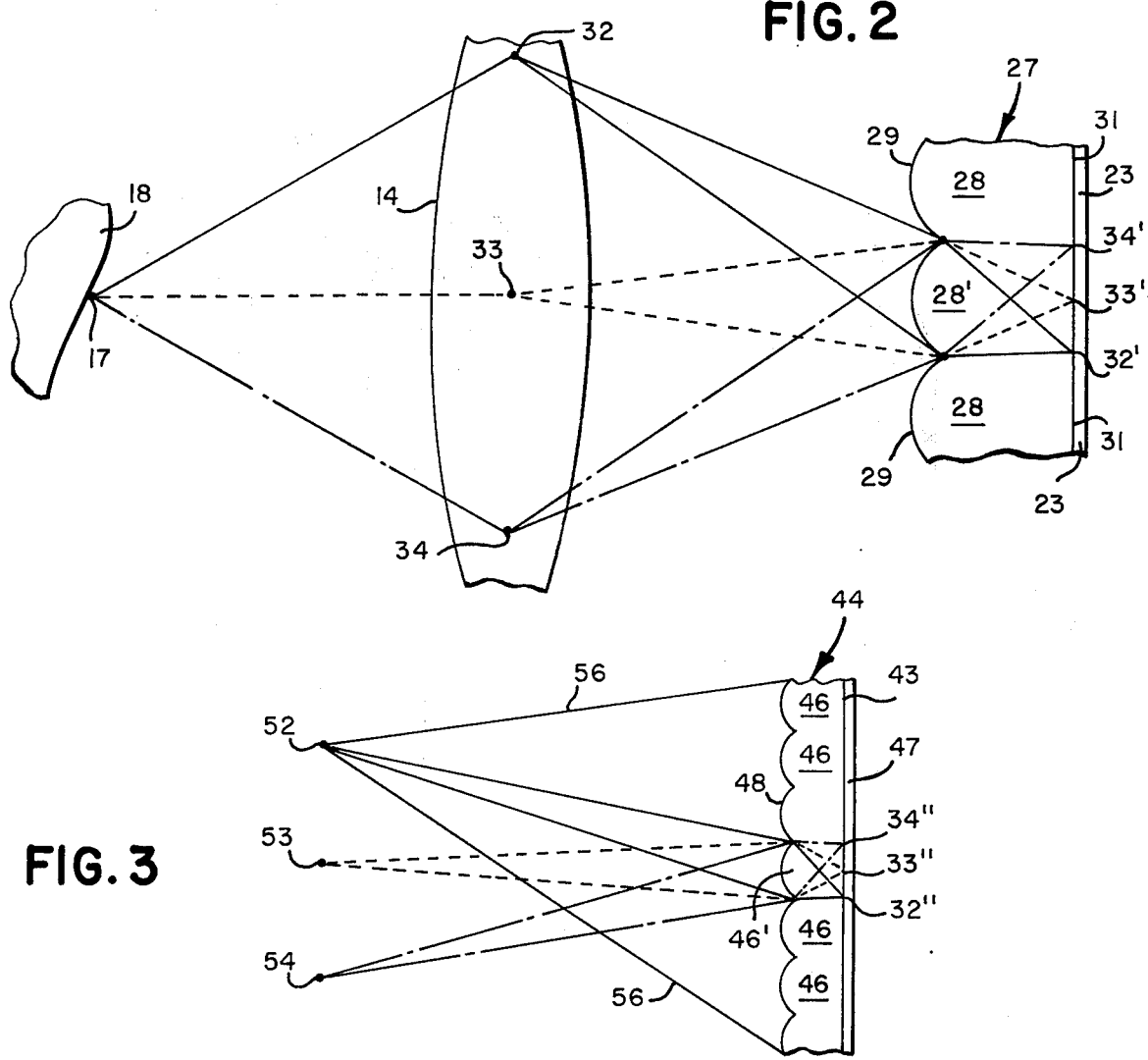
FIG. 2
FIG. 3

THREE-DIMENSIONAL TELEVISION

BACKGROUND OF THE INVENTION

The present invention relates to apparatus for providing a manifestation of the depth relationships in a three-dimensional scene and, more particularly, to such an apparatus which makes depth perception television a practical reality.

Much effort by many investigators has been devoted to producing three-dimensional television. The most effective visual cue for perceiving depth is achieved by presenting to each of the observer's retinas a separate view of the same scene as seen from two points which are separated laterally by an amount comparable to the binocular viewing base. This can be achieved in numerous ways and many variants have been proposed. The simplest way, in theory, is to use two conventional television cameras to record the differing views and then transmit such views along two separate channels for observance on two separate television receivers. The images on the two television monitors are then directed separately to the viewer's eye for which each is intended, by mirrors, prisms, special filters or related optical devices so that the differential parallax between the views provides the observer with an adequate "depth cue". While this approach is simple in concept, there are several difficulties which have precluded it from being commercially significant. For one, the transmission bandwidth needed for each presentation is doubled in view of the necessity of separately transmitting the two disparate images of the scene. Moreover, it has been found that the problem of assuring that each of the images is only transmitted to the eye of the viewer for which it is intended is not simple. While numerous ingenious proposals for solving this problem have been suggested, they have generally been more complex or expensive than is acceptable. For instance, the stereopair of views may be transmitted by a single camera by alternately transmitting the right eye and left eye view at a frequency greater than the flicker rate, or dividing the input face of the camera tube so that both the right and left eye images share one-half the input window simultaneously. A similar arrangement is contrived at the display terminal by alternately shielding the right and left eyes synchronously with the alternation at the transmitter, or by shielding the right and left eye views from the opposite eye when a split display screen is being used. These proposals have required more extensive changes to present video technology and equipment than manufacturers and consumers have been willing to adopt.

SUMMARY OF THE INVENTION

The present invention provides three-dimensional television with a minimum of expense and complexity to television manufacturers, television stations and television viewers. It is applicable to both black and white and color pick-up and displays, and is compatible with present transmitting and receiving equipment. No change in the electronics or allocated frequency bandwidth is required.

The invention is based on the broad concept of segregating or dispersing electromagnetic radiation, e.g., light, on the basis of the direction from which it approaches the dispersing means, rather than its wavelength as is commonly done. This angular dispersion can be accomplished by refraction of the radiation differently dependent upon its angle of approach with respect to at least one plane transverse to the dispersing means incident surface area.

As applied to producing a manifestation of the depth relationships in a three-dimensional scene, the invention incorporates the above principle by obtaining a multiplicity of images of the scene from different view locations while retaining the inherent differential parallax of the images due to the different view locations. To this end, the invention broadly comprises viewing means for receiving radiation from the three-dimensional scene at a multiplicity of locations having different angles of view of the scene, and dispersing means for receiving the radiation from the multiplicity of locations and segregating the same into a plurality of images of the scene as seen from the different viewing angles. If the scene is to be displayed to an observer, the multiplicity of images are displayed in a manner which assures that such eye of an observer retrieves at any one position only one image, which one image is dependent upon the viewing angle of the eye to the display surface area.

In most cases in which the depth relationship is to be recorded, the invention comprises a radiation sensing means, such as a conventional camera vidicon tube, having a radiation responsive surface area and means for converting radiation received by the surface area into a transducer signal representative of the location on such surface area at which the radiation is received. It further includes a viewing means for receiving radiation from a three-dimensional scene to be viewed at a multiplicity of locations having different angles of view of such scene. Such viewing means can be simply a large diameter objective lens which receives the radiation at a multiplicity of points across its diameter. A dispersing means, also most simply in the form of a lens, is provided for receiving the radiation from the multiplicity of locations on the viewing means and segregating the same into a plurality of images of the scene as seen from the different viewing angles.

When the invention includes a radiation sensing means as described above, the dispersing means then projects each of such images to a location or locations on the radiation responsive surface uniquely associated therewith. By a location "uniquely associated therewith" is meant a location on the surface which is different from the locations on such surface area for other ones of such images. The individual images thus projected onto the radiation responsive surface area are converted by the radiation sensing means into a transducer signal which contains information as to the specific location on the radiation responsive surface at which each of the images is received. The transducer signal is thus a manifestation of the original scene as viewed from different angles or, in other words, a manifestation of the depth relationships in the scene.

At the display terminal, the transducer signal is decoded to provide the individual images of the scene as seen from different viewing angles. More particularly, means, such as a conventional television reception tube, converts the signal into radiation representing each of the images emanating from a location or locations on a display face uniquely associated with the image in the same sense as the location or locations at which the image was received at the radiation responsive surface area at the pick-up end is associated therewith. A display means at the terminal then receives the radiation emanating from the display surface area and projects each of the images of the scene in the direction of the viewing angle represented thereby. Thus, the display which is ultimately projected at the terminal is a multiplicity of images of the scene which differ from one another by the viewing angle at which radiation from the original scene is received by the viewing means. An observer viewing the display will therefore see with each of his eyes those images of the scene which correspond to the actual views he would see if he were observing the original scene. Such views will differ parallactically so that he will receive a true manifestation of the depth in the original scene. Moreover, such visual manifestation will have "look-around". That is, as the observer moves his eyes laterally with respect to the display, the views he will perceive from the display will change to correspond with the new eye locations, just as such views would change if he moved his eyes laterally when viewing the original scene. This changing view relationship provides the observer with a sense of depth perception by enabling him to "look around" objects in the scene by an amount proportional to the depth of such objects in the scene with respect to the remainder of the scene. In this connection, the display means is adapted to project in the direction of each angle of view of the scene only that radiation emanating from the display surface area representative of the image seen from such angle of view. This assures that other radiation emanating from the display surface area, i.e., radiation representing other angles of view of the scene, will not interfere with the image properly seen from such angle of view.

Most desirably, the dispersing means at the pick-up end of the system dissects the multiplicity of images of the scene into image elements representing the various aspects or points of the scene as seen from the different viewing angles, and it is these image elements which are projected onto the radiation responsive surface area to locations uniquely associated therewith. The display means at the terminal end of the system, in turn, combines the image elements of each of the images to reconstitute the images as seen from different angles of view. Moreover, the dispersing means at the pick-up end of the system converges each image element in at least one direction to thereby minify the image in such direction, and the display means at the terminal magnifies such image elements for combination into the reconstituted full images as stated above, of the scene as seen from different angles. This minification and subsequent magnification facilitates the inclusion of the multiplicity of images on a standard size camera pick-up surface and in a normal transmission bandwidth, while at the same time assuring that the views displayed at the terminal are full, undistorted views.

The dissection of the full images of the scene into image elements representing the various aspects of the scene as seen from different viewing angles, as well as their minification and projection onto locations uniquely associated therewith on the radiation responsive surface area, is most simply accomplished by the dispersing means being a lenticulated grid providing, in effect, a multiplicity of spatially repeating, similar lens elements. Each of such lens elements is adapted to refract differently radiation which is received by it from different directions with respect to at least one common plane. Because of such differential refraction, each lens element at the pick-up end of the arrangement will provide the plurality of image elements of each aspect or point of the scene dependent upon the direction from which the radiation representing such aspect is received at the lens element.

The display means is also most simply a lenticulated grid at the display terminal which is adapted to reverse this process. That is, such display grid is made up of a multiplicity of spatially repeating, similar lens elements which refract differently radiation received from various locations on the display screen so as to emit toward each position in front of the display grid only that radiation which was received by the camera grid from a corresponding position in front of it.

A simple geometry for each of the lens elements so that it will provide the above is a cylindrical section geometry, i.e., a geometry in which a first radiation transmission surface of each lens element is convex with a cylindrical configuration, and a second radiation transmission surface is planar or flat. For ease of manufacture, the cylindrical surface is made the incident surface for those elements making up the dispersing grid at the pick-up end of the system, and the planar surface is the surface of the lens elements of the display grid which receives the radiation emanating from the display surface area. With this geometry, the series of lens elements making up the lenticulated grid at the pick-up end of the system will dissect the field of view received from the viewing means into many narrow, vertical strips, each of which is an image element of a specific aspect of the scene and is laterally displaced by the lenticulated grid by an amount dependent upon the angle of approach of the radiation representing the aspect to the incidence surface of such grid. The vertical strips representing aspects of the many different images will be juxtaposed to one another. The described geometry of each lens element will also provide the desired minification of each aspect of the scene. That is, the vertical image strips will be converged images in the horizontal direction.

At the display end of the system, when the lens elements are properly aligned with the display surface area, their geometry will cause each image vertical strip emanating from such surface to be magnified by the lens element which receives it so as to fill the full width of the lens and blend with corresponding vertical strips from adjacent lens elements so as to reconstruct the entire scene. Moreover, each reconstructed scene will be projected by the lenticulated grid only in the direction from which it was received at the dispersing grid at the pick-up end of the system.

The invention includes other features and advantages which will become apparent from the following more detailed description of the preferred embodiment.

BRIEF DESCRIPTION OF THE DRAWING

With reference to the accompanying drawing:

FIG. 1 is a schematic plan view of a closed circuit television arrangement incorporating the present invention;

FIG. 2 is an enlarged partial plan view of the camera optics schematically illustrating a typical ray tracing representative of the treatment by the preferred embodiment of the invention of light emanating from a single point or aspect of a scene being viewed;

FIG. 3 is an enlarged partial plan view of the display optics illustrating ray tracings therefrom corresponding to the ray tracings of FIG. 2.

DETAILED DESCRIPTION OF A PREFERRED EMBODIMENT

With reference to the drawing, FIG. 1 illustrates a closed circuit television system incorporating the invention. Such system includes, as is usual, a camera 11 suitably connected via a transmission cable 12 to a monitor 13. Both the camera and the monitor include those electronic components normally associated therewith. However, the optics of the camera and the display face of the monitor are modified to incorporate the invention.

The optics of the camera first includes viewing or focusing lens means for receiving light radiation from the scene at a multiplicity of locations having different angles of view of the scene and focusing the same to a composite image of the scene. To this end, an objective optical lens 14 is positioned facing the scene to receive such light radiation across its midplane 16. As will be apparent to those skilled in the art, light radiation from each aspect or point of the scene being viewed, such as the point 17 of the object 18 in the scene, will be received across the full diameter of the lens as indicated by the ray tracings 19 in FIG. 1. Likewise, every location along the midplane of the lens 14, such as the point 21, will receive light from all points in the scene as schematically represented for the object 18 by the ray tracings 22.

Lens 14 is a convergent lens which is positioned in front of the radiation responsive surface, i.e., the light sensitive window 23, of a vidicon or similar pick-up tube in the camera 11 to bring light received by such lens to a focus on such window 23. Thus, the light radiation from the point 17 as represented by the ray tracings 19 will be focused toward a corresponding point on the window 23, and the light radiation being received at point 21 in the lens from all points in the scene as represented by ray tracings 22 will be focused toward a composite image on a plane containing the window 23. This light radiation emanating from the lens 14 corresponding to the incoming ray tracings 19 and 22 is represented in FIG. 1 by ray tracings 24 and 26, respectively.

From the above, it should be apparent that the lens 14 will differentially refract the light it receives over its entire incident surface so as to converge all light having come from a given point in a scene, such as the point 17, toward a common point in the focal plane of the lens. In other words, the lens 14 collects radiation representing a multiplicity of views of the point 17 across its midplane, each of which views has a different viewing angle with respect to such point, and projects such radiation toward the window 23 with different angles of exit from such lens which correspond to the viewing angles.

The invention further includes a dispersing means for receiving the light radiation from the lens 14 prior to it reaching the window 23 and segregating the same into a plurality of images of the scene as seen from the different viewing angles. This is accomplished by disecting the focussed radiation into a plurality of image elements of each aspect of the scene. More particularly, as is best illustrated in FIG. 2, a lenticulated grid 27 providing a multiplicity of spatially repeating, similar lens elements 28, is positioned immediately in front of the window 23. Each lens element 28 has an incident surface 29 which conforms to a cylindrical section surface, having a vertical axis. The exit surface 31 of each lens element is, on the other hand, planar.

The configuration of each lens element results in it refracting radiation received by it differently depending upon the angle by which such radiation approaches the element and, hence, depending upon the angle of the view of the scene represented by it. Because of such differential refraction, the images represented by such radiation will be displaced laterally from one another by the lens element depending on the direction from which they approach the lens element, rather than being superimposed on one another at the window 23 as would be the case if the lenticulated grid were not provided. This phenomenon is illustrated for radiation from the point 17 by the ray tracings in FIG. 2. Radiation received at the spaced locations 32, 33 and 34 on the midplane of the lens 14 is all refracted toward a specific lens element 28' of the grid 27. As is shown, the lens element 28' refracts the radiation representing the object point 17 received by it from the lens location 32 to the location 32' on the window 31. However, the lens element 28' refracts the radiation representing point 17 it receives from the locations 33 and 34 in lens 14 to the locations 33' and 34', respectively, on the window 23.

The radiation received at the locations 32', 33' and 34' on the window represents image elements of the aspect of the full scene provided by the point 17. As will be recognized, each image element represents a view of such aspect from a different direction, with the image elements of full views from specific locations adjacent one another. The full parallactically differing views are thus dissected into the image elements which are juxtaposed with one another.

It will further be recognized that because of the cylindrical nature of the lens elements 28, each of the image elements of each view will be a vertical linear image or "strip" of a corresponding vertical strip in the original scene. That is, since each of the lens elements has a vertical cylindrical section as an incident surface, each aspect of the scene will be laterally segregated into a plurality of images only in a horizontal direction — not in the vertical direction. As a practical matter, this is all that is necessary since depth perception is cued by the receipt at the viewer's two eyes of images which differ parallactically in the direction of binocular separation, which is typically in the horizontal direction — not the vertical direction.

Each lens element has a configuration and size not only to separate each aspect of the scene into a plurality of image elements and focus the same on the radiation responsive surface represented by the window 23, but also to converge the radiation representing each image element in a horizontal plane to thereby provide an image element which is converged in such direction or, in other words, "minified" in the horizontal plane. Thus, the image elements at the locations 32', 33' and 34' are all minified images in the horizontal direction of the aspect 17.

The radius of curvature and the arc length of the incident surface of each lens element is chosen relative to the diameter and focal length of the lens 14 so that the light coming from the extreme edges of the field of view of the lens 14 will fall within the width of a lens element after refraction thereby, and will also completely fill such width. There should be no strips void of image elements behind the grid, nor should the image elements behind one lenticulation overlap those behind adjacent lens elements. This will assure that the images of differing aspects of the scene will not be overlapped at the radiation responsive surface.

The camera conventionally has means for converting the radiation received by the surface area into an electrical transducer signal representative of the location on the surface at which the radiation is received. Such electrical signal thus provides a manifestation of the depth relationships in the three-dimensional scene. This electrical signal is conveyed by transmission cable 12 to the display terminal 13 which extracts the coded data therefrom in a conventional manner and displays it on a suitable monitor. More particularly, such signal is directed, as is usual, to the electron gun 41 of a television picture tube 42. The tube 42 converts the electrical signal into radiation emanating from a display surface area of the tube, which area is represented in FIGS. 1 and 3 by tube face 43. It will be recognized that with the usual synchronization, etc., the radiation emanating from such face will be a replica (except for scale) of that radiation which is received by the radiation responsive surface 23 of the camera tube. Thus, it will represent the multiplicity of image elements of each aspect of the scene making up the plurality of views of such scene as seen from different angles of view.

In accordance with the invention, the display terminal further includes display means for receiving the radiation from the display surface area and projecting each image of the scene in the direction of the angle of view represented thereby. More particularly, another lenticulated grid 44 made up of a plurality of lens elements 46 is located in front on the display area to intercept the radiation emanating from the face 43. Each of the lens elements 46 is of the same configuration as the corresponding lens element 26 of the grid 16 and, in this connection, includes a planar incident surface 47 and an exit surface 48 which is a cylindrical section having a vertical axis and a focal length such that it focuses on the face 43. With such construction, each lens element will magnify the minified linear elements displayed on the face 43. Since the magnified linear elements will completely fill the width of the cylindrical surface of the lens element which receives it, each eye of an observer will see at any one time only one image element behind each lens element. Such image element will correspond to similar magnified image elements emanating from adjacent lens elements to provide a reconstruction of the full image of the scene as viewed from the angle from which it is being observed by the respective eyes. In this connection, the grid 44 will project to any one viewing location only that radiation which makes up the full image of the scene as viewed from such location. Thus, the radiation appearing on the face 43 which is not part of the view from such location will not interfere with the image.

If the observer should move his eye horizontally with respect to the display, such eye will be presented a different viewing angle to the scene, i.e., the viewer's line of sight to the display face will be refracted laterally by the grid 44 and it will focus on the image elements being displayed representing a view of the scene as seen from the new viewing angle.

It will be appreciated that in order to assure proper alignment with the lenticulated grid of all the image elements of the scene which emanate from the display face, it may be necessary to adjust the horizontal expansion of the display emanating from the face 43, relative to the width of the lens elements 46. The manner of doing so is well known, and means are often included on presently available television monitors for this purpose.

FIG. 3 schematically illustrates receipt at three observer eye locations 52, 53 and 54 of radiation emanating from the display terminal. Each of such eye locations 52, 53 and 54 respectively represent viewing locations corresponding to the viewing locations 32, 33 and 34 on the objective lens 14 of the original scene.

As represented by the ray tracings 56 for the location 52, each of the locations will receive radiation representing all aspects of the scene from across the full surface area of the grid. The image element received from each lens element will, however, be that image element of the aspect of the scene displayed behind the lens element which corresponds to the angle of view of the viewing location. Thus, for example, assuming the image element of point 17 in the original scene is the image element behind lens element 46', such image element will be replicated at locations 32'', 33'' and 34'' for the viewing locations 52, 53 and 54. Lens element 46' will project the respective image elements to their associated viewing locations while at the same time refracting all image elements which are not associated with such viewing locations in other directions. This is important to provide a clear and non-distorted full image from each location.

It should be noted that the depth perception view which is obtained at the display terminal is actually projected from a display screen which is essentially two-dimensional. Thus a manifestation of the depth in the scene is obtained without the necessity of a display medium which is actually three-dimensional.

Although the invention has been described in connection with a preferred embodiment thereof, it will be appreciated by those skilled in the art that various changes can be made without departing from the spirit of the invention. In this connection, although the invention has been described with reference to light radiation and visual information, it will be appreciated that it is equally applicable to information systems utilizing other portions of the radiation spectrum, such as acoustic, infra red, ultra violet, radio frequency and UHF radiation. Moreover, the coded signal generated by the radiation transducer can be stored, for example, on magnetic tape for later transmission or playback. In view of these and other changes, it is intended that the coverage afforded applicant be limited only by the claims and their equivalent language.

I claim:

1. Apparatus for viewing a three-dimensional scene and providing a manifestation of the depth relationships therein comprising: a radiation sensing means having a radiation responsive surface area and means for converting radiation received by said surface area into a transducer signal representative of both the intensity of said radiation and the locations on said surface area at which said radiation is received; focusing lens means for receiving radiation from said scene at a multiplicity of locations having different angles of view of each point in said scene and focusing the same from said multiplicity of locations to a composite image at a focal plane of said focusing lens means; and dispersing lens means for receiving the radiation focused to said composite image from said multiplicity of locations and dissecting the same into a plurality of image elements of each point in said scene corresponding to said different viewing angles of said scene and thereafter projecting each of said image elements to a location uniquely associated therewith on the radiation responsive surface area of said sensing means, the location on said radiation responsive surface area for each of said image elements being different from the locations thereon for the other of said image elements.

2. The apparatus of claim 1 wherein the locations on said radiation responsive surface for image elements of each point in said scene as seen from different viewing angles are juxtaposed.

3. The apparatus of claim 2 wherein said dispersing lens means is adapted to converge in the direction of at least one plane radiation received thereby whereby each of said image elements is a minified image of the point in said scene represented thereby.

4. The apparatus of claim 3 wherein said dispersing lens means is a lens located generally at said focal plane and in front of said radiation responsive surface of said sensing means adapted to separate by differential refraction the radiation received from said focusing lens means from directions having different directional components with respect to at least one plane transverse to the incident surface area of said dispersing lens means to thereby provide said plurality of image elements representing each point in said scene as seen from different angles of view.

5. The apparatus of claim 4 wherein said directional component plane is a generally horizontal plane and said lens is adapted to separate radiation received thereat from said focusing lens means into a plurality of generally vertical image elements which are converged in a horizontal direction.

6. The apparatus of claim 5 wherein said lens is made up of a multiplicity of spatially repeating, similar cylindrical lens elements, a first radiation transmission surface of each being a generally cylindrical section possessing a generally vertical axis, and a second radiation transmission surface thereof being a generally planar surface.

7. The apparatus of claim 1 further including transducer means for converting the transducer signal representative of both said radiation intensity and the locations at which said radiation is received on said radiation responsive surface area into radiation emanating from corresponding locations on a display surface area, and display means for receiving said radiation from said display surface area and projecting each of the image elements of each point in said scene represented thereby in the direction of the angle of view of the point in the scene by which said radiation was received by said focusing lens means.

8. The apparatus of claim 7 wherein said display means projects in the direction of each angle of view of said scene only that radiation emanating from said display surface area representative of the image seen from said angle of view, whereby radiation emanating from said display surface area representative of image elements seen from other angles of view does not interfere with said image as seen from said angle of view.

9. The apparatus of claim 8 wherein said dispersing lens means is adapted to converge in the direction of at least one plane radiation received thereby, whereby each of said image elements received at said radiation responsive surface is a minified image with respect to said plane of the point in said scene represented thereby, and said display means is adapted to magnify such image elements upon emanation thereof from said display surface area for combination thereof into reconstituted images of said scene as seen from different viewing angles.

10. The apparatus of claim 9 wherein said plane with respect to which radiation is converged by said dispersing means is a generally horizontal plane.

11. The apparatus of claim 10 wherein both said dispersing lens means and said display means are lenses located respectively in front of said radiation responsive surface area and said display surface area, said dispersing lens being adapted to separate by refraction radiation received from said viewing means from directions having different directional components in at least one plane transverse to the dispersing lens incident surface and thereby provide said multiplicity of images of each point in said scene as seen from different angles of view, and said display lens being adapted to refract from each image of said scene from a different angle of view, those image elements emanating from said display surface area which are not part of said image.

12. The apparatus of claim 11 wherein both said dispersing and said display lenses are made up of a multiplicity of spatially repeating, similar cylindrical lens elements, a first radiation transmission surface of each element being in the form of a generally cylindrical section possessing a generally vertical axis, and a second radiation transmission of each element being a generally planar surface.

13. Apparatus for extracting a manifestation of the differential parallax inherent in a three-dimensional scene from a transducer signal having information defining a multiplicity of image elements of all points in said scene as such points are seen from different angles of view to define said differential parallax, comprising means for converting said signal into radiation representing each of said image elements emanating from locations on a display surface area uniquely associated therewith, and display means positioned relative to said display surface area to be responsive to receipt of said radiation from said display surface area by projecting each of said image elements in the direction of the angle of view of the point in the scene represented thereby and combining image elements projected to the same location into a reconstituted image of said scene.

14. The apparatus of claim 13 wherein said display means projects in the direction of each angle of view of said scene only that radiation emanating from said display surface area representative of the image seen from said angle of view, whereby radiation emanating from said display surface area representative of images seen from other angles of view does not interfere with said image as seen from said angle of view.

15. The apparatus of claim 14 wherein each of said image elements represented by said transducer signal is a minified image element with respect to a generally horizontal plane of the point in said scene representative thereby; and said means for converting said signal into radiation emanating from locations on its display surface area converts the same into image elements correspondingly minified in a generally horizontal plane, and said display means magnifies each of said image elements in the direction of said horizontal plane for combination with correspondingly magnified image elements into said reconstituted images of said scene.

16. The apparatus of claim 14 wherein said display means is a lens made up of a multiplicity of spatially repeating, similar cylindrical lens elements, a first radiation transmission surface of each being in the form of a generally cylindrical section possessing a generally vertical axis, and a second radiation transmission surface of each being a generally planar surface, each of said cylindrical lens elements being positioned relative to said display surface area to receive radiation emanating therefrom representing all image elements of a corresponding point in said scene as seen from different viewing angles.

17. Apparatus for viewing a three-dimensional scene and providing a manifestation of the depth relationships therein comprising focusing lens means for receiving radiation from the scene at a multiplicity of locations having different angles of view of each point in said scene and focusing the same from said multiplicity of locations to a composite image of said scene at a focal plane, and dispersing lens means for receiving the radiation focused to said composite image from said multiplicity of locations and dissecting the same by differential refraction into a plurality of image elements of each point in said scene corresponding to said different viewing angles of said scene and projecting each of said image elements to a location uniquely associated therewith on a radiation responsive surface area, the location on said radiation responsive surface area for each of said image elements being different from the locations thereon for the other of said image elements.

18. The apparatus of claim 17 wherein said dispersing lens means is adapted to separate by differential refraction radiation received from said viewing means from directions having different directional components in at least one plane to thereby provide said dissection of said radiation into a plurality of image elements.

19. The apparatus of claim 18 wherein said dispersing lens means is a lens positioned generally at said focal plane and made up of at least one lens element having a first radiation transmission surface which is a cylindrical section and a second radiation transmission surface which is a generally planar surface.

20. A method for providing a manifestation of the depth relationships within a three-dimensional scene comprising the steps of: focusing radiation from said scene received at a multiplicity of locations having different angles of view of each point in said scene to a composite image of said scene at a focal plane; dissecting said focussed radiation into a plurality of image elements of each point in said scene differing from one another by the different angle of view of said point represented by each; projecting each of said image elements to a location uniquely associated therewith on a radiation responsive surface; converting radiation representative of said image elements received by said radiation responsive surface into a transducer signal representative of both said image elements and the locations on said surface area at which radiation representing said respective image elements is received; converting said transducer signal into radiation emanating from a radiation display surface area representative both of said image elements and the respective locations on said radiation responsive surface at which said radiation was received; and thereafter combining the image element radiation emanating from said display surface area representing a view of said scene from any particular location into a reconstituted image of said scene as seen from said location.

* * * * *